(12) United States Patent  
Sharma et al.

(10) Patent No.: US 12,293,618 B2
(45) Date of Patent: May 6, 2025

(54) METHOD OF PROVIDING INFORMATION RELATED TO STATUS OF ELECTRIC VEHICLE

(71) Applicant: GM Global Technology Operations LLC, Detroit, MI (US)

(72) Inventors: Manoj Kumar Sharma, Troy, MI (US); Michael Alan Losh, Rochester Hills, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 26 days.

(21) Appl. No.: 18/448,516

(22) Filed: Aug. 11, 2023

(65) Prior Publication Data

US 2025/0054344 A1  Feb. 13, 2025

(51) Int. Cl.
*G07C 5/08* (2006.01)
*B60L 53/66* (2019.01)
*B60Q 1/50* (2006.01)
*G07C 5/00* (2006.01)

(52) U.S. Cl.
CPC ............ *G07C 5/0825* (2013.01); *B60L 53/66* (2019.02); *B60Q 1/5035* (2022.05); *B60Q 1/543* (2022.05); *G07C 5/008* (2013.01); *G07C 5/0833* (2013.01)

(58) Field of Classification Search
CPC .... G07C 5/0825; G07C 5/008; G07C 5/0833; B60L 53/66; B60Q 1/5035; B60Q 1/543
USPC ........................................................ 340/468
See application file for complete search history.

(56) References Cited

U.S. PATENT DOCUMENTS

| | | | | |
|---|---|---|---|---|
| 5,757,595 | A * | 5/1998 | Ozawa ................... | B60L 58/12 340/455 |
| 8,063,757 | B2 * | 11/2011 | Frey ...................... | B60Q 1/543 340/455 |
| 9,818,268 | B2 * | 11/2017 | Muntada Roura ..... | B60Q 1/543 |
| 10,513,197 | B1 * | 12/2019 | Carpenter ............ | B60Q 1/2661 |
| 10,946,760 | B2 * | 3/2021 | Miftakhov ............ | B60L 53/64 |
| 11,580,798 | B2 * | 2/2023 | Weber .................... | B60L 58/12 |
| 11,718,189 | B2 * | 8/2023 | Coburn .................. | H05B 45/10 340/455 |
| 2009/0082957 | A1 | 3/2009 | Agassi et al. | |
| 2011/0043355 | A1 | 8/2011 | Chander et al. | |
| 2012/0025765 | A1 * | 2/2012 | Frey ...................... | B60L 3/0069 320/109 |
| 2012/0242466 | A1 * | 9/2012 | Stillfried ................ | B60L 58/12 340/425.5 |
| 2012/0309455 | A1 | 12/2012 | Klose et al. | |
| 2014/0253306 | A1 * | 9/2014 | Gillespey ............... | B60L 53/14 340/425.5 |

(Continued)

FOREIGN PATENT DOCUMENTS

| | | |
|---|---|---|
| DE | 102013226188 A1 | 7/2014 |
| DE | 102014222695 A1 | 10/2015 |
| DE | 102018220429 A1 | 5/2020 |

*Primary Examiner* — Eric Blount
(74) *Attorney, Agent, or Firm* — Vivacqua Crane, PLLC

(57) ABSTRACT

A method of providing information related to a charge status of an electric vehicle includes monitoring, with a system controller in communication with an electrical system within the vehicle, information related to a charge status of the vehicle, and, displaying, with the system controller, for a person in proximity of the vehicle, information related to a charge status of the vehicle.

19 Claims, 7 Drawing Sheets

(56) References Cited

U.S. PATENT DOCUMENTS

| | | | |
|---|---|---|---|
| 2015/0314697 A1* | 11/2015 | Chen | B60L 58/10 |
| | | | 340/455 |
| 2016/0068076 A1* | 3/2016 | Seo | B60L 1/02 |
| | | | 701/22 |
| 2016/0363991 A1 | 12/2016 | Schlecht et al. | |
| 2018/0065544 A1* | 3/2018 | Brusco | B60L 1/14 |
| 2019/0232795 A1* | 8/2019 | Zendler | B60Q 1/44 |
| 2020/0006969 A1 | 1/2020 | Penilla et al. | |
| 2020/0101858 A1* | 4/2020 | Kuroda | B60L 1/003 |

* cited by examiner

METHOD OF PROVIDING INFORMATION RELATED TO STATUS OF ELECTRIC VEHICLE

The present disclosure relates to systems and methods for providing information related to a charge status of an electric vehicle.

With increasing number of electric vehicles and the limited number of charging stations available, it is important to efficiently use the charging infrastructure to reduce wait time and provide the user and others in a queue with live information about charging status, charging rate and estimated time left to get the desired charging level, as well as reporting a malfunctioning charging station to the owner to keep the maintenance service providers informed and ensure timely repair.

Thus, while current systems and methods achieve their intended purpose, there is a need for a new and improved system and method for providing information related to a charge status of an electric vehicle.

SUMMARY

According to several aspects of the present disclosure, a method of providing information related to a charge status of an electric vehicle includes monitoring, with a system controller in communication with an electrical system within the vehicle, information related to a charge status of the vehicle, and displaying, with the system controller, for a person in proximity of the vehicle, information related to a charge status of the vehicle.

According to another aspect, the monitoring, with the system controller in communication with the electrical system within the vehicle, information related to a charge status of the vehicle further includes monitoring, with the system controller, at least one of: a level of charge of the electrical system within the vehicle; a charging rate of the electrical system within the vehicle, when the vehicle is connected to a charging station; a time left until the vehicle is charged to a pre-determined threshold, when the vehicle is connected to a charging station; and an operating status of a charging station connected to the vehicle.

According to another aspect, the monitoring, with the system controller, a time left until the vehicle is charged to a pre-determined threshold, when the vehicle is connected to a charging station further includes calculating the pre-determined threshold based on one of: when the vehicle is fully charged; and, when the vehicle is charged sufficiently to allow the vehicle to travel from the charging station to a planned destination.

According to another aspect, the displaying, with the system controller, for a person in proximity of the vehicle, information related to the charge status of the vehicle further includes displaying, with an internal/external display system in communication with the system controller and adapted to project information related to the charge status of the vehicle onto a window surface of the vehicle, wherein the projected information is visible from inside the vehicle and from outside the vehicle.

According to another aspect, the displaying, with the system controller, for a person in proximity of the vehicle, information related to the charge status of the vehicle further includes at least one of: actuating, with a lighting system within the vehicle and in communication with the system controller, at least one exterior light of the vehicle; and, actuating, with the system controller, and audible device.

According to another aspect, the displaying, with the system controller, for a person in proximity of the vehicle, information related to the charge status of the vehicle further includes displaying, with an externally mounted projector in communication with the system controller, information related to the charge status of the vehicle onto a surface adjacent the vehicle.

According to another aspect, the displaying, with the system controller, for a person in proximity of the vehicle, information related to the charge status of the vehicle further includes displaying, with an externally mounted projector in communication with the system controller, light outward from the vehicle onto floating particles within proximity of the vehicle, and creating a three-dimensional image including information related to the charge status of the vehicle.

According to another aspect, the displaying, with the system controller, for a person in proximity of the vehicle, information related to the charge status of the vehicle further includes: sending, with the system controller, information related to the charging status of the vehicle to a connected charging station; and, displaying, with a display associated with the charging station, information related to the charging status of the vehicle.

According to another aspect, the displaying, with the system controller, for a person in proximity of the vehicle, information related to the charge status of the vehicle further includes: sending, with the system controller, information related to the charging status of the vehicle to a personal device associated with a person; and, displaying, with the personal device, information related to the charging status of the vehicle.

According to another aspect, the displaying, with the system controller, for a person in proximity of the vehicle, information related to the charge status of the vehicle further includes displaying, with a vehicle infotainment system in communication with the system controller and adapted to display information related to the charge status of the vehicle within a human machine interface of the infotainment system.

According to another aspect, the displaying, with the system controller, for a person in proximity of the vehicle, information related to the charge status of the vehicle further includes displaying, with the system controller, for a person in proximity of the vehicle, information related to the charge status of the vehicle when a status request is initiated by at least one of: a manual request by a person within the vehicle; a manual request by a remote person via a personal device; automatically based on a distance to a destination, travel time to the destination and current charge level of the vehicle; and, automatically based on current charge status of the vehicle and the vehicle's proximity to a charging station.

According to several aspects of the present disclosure, a system for providing information related to a charge status of an electric vehicle includes a system controller in communication with an electrical system within the vehicle, the system controller adapted to: monitor information related to a charge status of the vehicle, including at least one of: a level of charge of the electrical system within the vehicle; a charging rate of the electrical system within the vehicle, when the vehicle is connected to a charging station; a time left until the vehicle is charged to a pre-determined threshold, when the vehicle is connected to a charging station, wherein the system controller is adapted to calculate the pre-determined threshold based on one of: when the vehicle is fully charged; and, when the vehicle is charged sufficiently to allow the vehicle to travel from the charging station to a planned destination; and, an operating status of a charging station connected to the vehicle; and, display, for a person in proximity of the vehicle, at least one of: a level of charge of the electrical system within the vehicle; a charging rate of the electrical system within the vehicle, when the vehicle is connected to a charging station; a time left until the vehicle is charged to the pre-determined threshold, when the vehicle is connected to a charging station; and, an operating status of a charging station connected to the vehicle.

According to another aspect, when displaying information related to the charge status of the vehicle, the system controller is further adapted to display, with an internal/external display system in communication with the system controller and adapted to project information related to the charge status of the vehicle onto a window surface of the vehicle, wherein the projected information is visible from within the vehicle and from outside the vehicle.

According to another aspect, when displaying information related to the charge status of the vehicle, the system controller is further adapted to at least one of: actuate, with a lighting system within the vehicle and in communication with the system controller, at least one exterior light of the vehicle; and, actuate, with the system controller, an audible device.

According to another aspect, when displaying information related to the charge status of the vehicle, the system controller is further adapted to at least one of: display, with an externally mounted projector in communication with the system controller, information related to the charge status of the vehicle onto a surface adjacent the vehicle; and, display, with an externally mounted projector in communication with the system controller, light outward from the vehicle onto floating particles within proximity of the vehicle, and creating a three-dimensional image including information related to the charge status of the vehicle.

According to another aspect, when displaying information related to the charge status of the vehicle, the system controller is further adapted to: send information related to the charging status of the vehicle to a connected charging station; and, display information related to the charging status of the vehicle with a display associated with the charging station.

According to another aspect, when displaying information related to the charge status of the vehicle, the system controller is further adapted to: send information related to the charging status of the vehicle to a personal device associated with a person; and, display, with the personal device, information related to the charging status of the vehicle.

According to another aspect, when displaying information related to the charge status of the vehicle, the system controller is further adapted to display, with a vehicle infotainment system in communication with the system controller and adapted to display information related to the charge status of the vehicle within a human machine interface of the infotainment system.

According to another aspect, the system controller is further adapted to display, for a person in proximity of the vehicle, information related to the charge status of the vehicle when a status request is initiated by at least one of: a manual request by a person within the vehicle; a manual request by a remote person via a personal device; automatically based on a distance to a destination, travel time to the destination and current charge level of the vehicle; and, automatically based on current charge status of the vehicle and the vehicle's proximity to a charging station.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
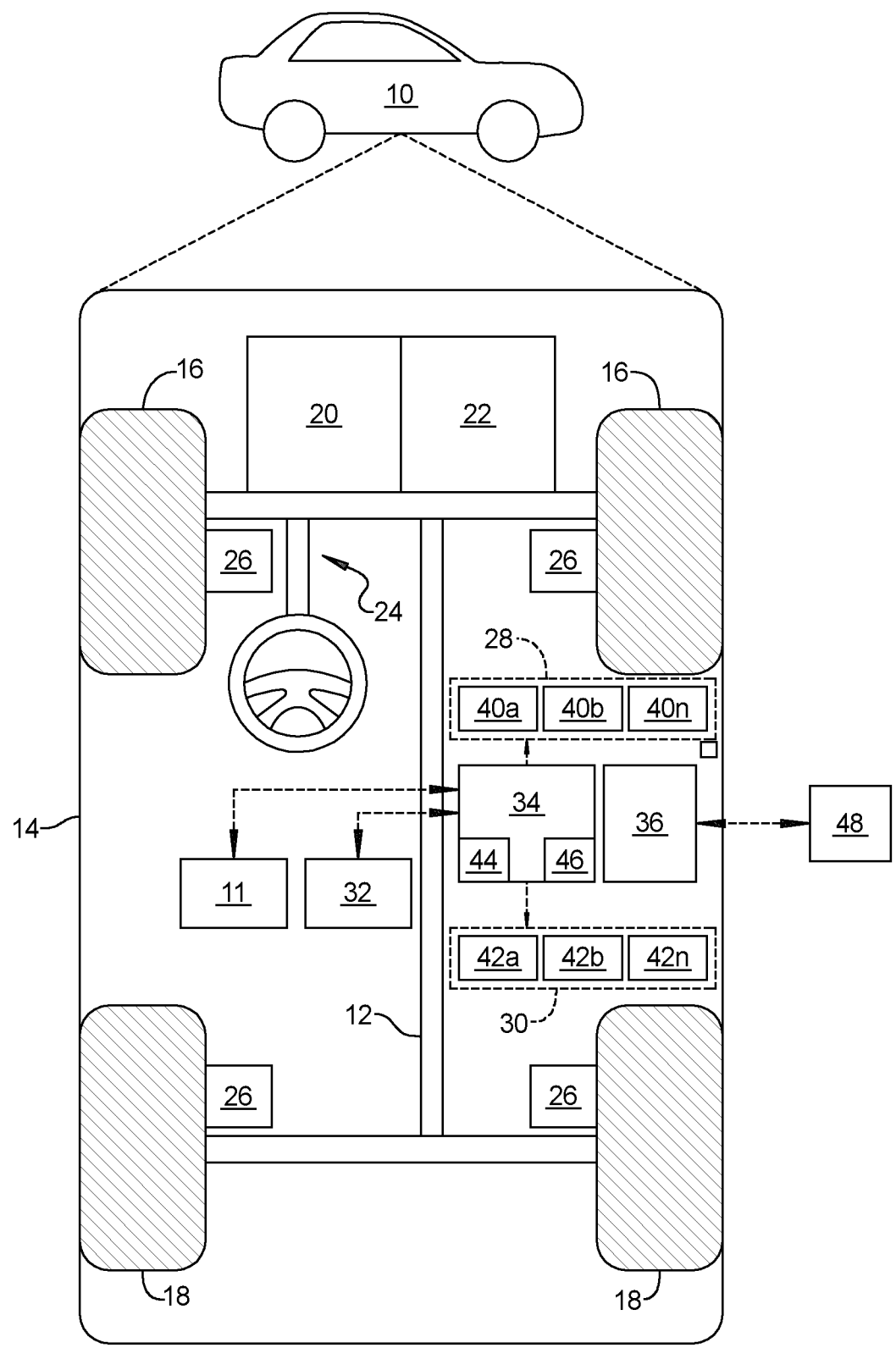
FIG. 1 is a schematic diagram of a vehicle having a system in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows an electric vehicle 10 with an associated system 11 for providing information related to a charge status of the electric vehicle 10 in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
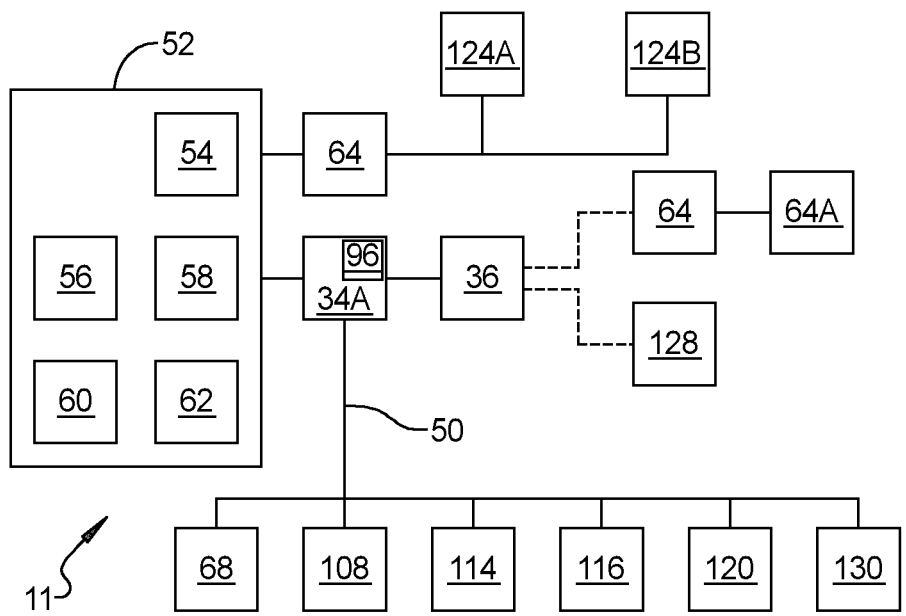
FIG. 2 is a schematic diagram of a system according to an exemplary embodiment.

Referring to FIG. 2, the system 11 is shown in more detail, wherein, the system 11 includes a system controller 34A. The system controller 34A may be the vehicle controller 34, or the system controller 34A may be a separate controller in communication with the vehicle controller 34. The system controller 34A is in communication, over a vehicle communication bus 50, with an electrical system 52 of the electric vehicle 10. The electrical system 52 includes a battery pack 54, power inverter 56, electric motor 58, onboard battery charger 60 and a battery management system 62.

The system controller 34A is adapted to monitor information related to a charge status of the vehicle 10. In an exemplary embodiment, the system controller 34A is adapted to monitor at least one of a level of charge of the electrical system 52 within the vehicle 10, a charging rate of the electrical system 52 within the vehicle 10, when the vehicle 10 is connected to a charging station 64, a time left until the vehicle 10 is charged to a pre-determined threshold, when the vehicle 10 is connected to a charging station 64, and an operating status of a charging station 64 that is connected to the vehicle 10.

In an exemplary embodiment, the system controller 34A is adapted to calculate the pre-determined threshold based on one of: when the vehicle is fully charged, and when the vehicle is charged sufficiently to allow the vehicle to travel from the charging station to a planned destination. For example, the pre-determined threshold may be based on when the vehicle 10 is fully charged, wherein, when the vehicle 10 is plugged into a charging station, the system controller 34A will monitor the charging of the vehicle 10 and the time left until the vehicle 10 is charged to the pre-determined threshold will be the time left until the vehicle 10 is fully charged. In another example, the vehicle 10 may be located at a charging station 64 that is one hundred miles from the owner's home. In order to ensure that the owner of the vehicle spends as little time as possible at the charging station, the pre-determined threshold is based on when the vehicle 10 is charged to a sufficient level to allow the vehicle 10 to travel from the charging station 64 to the owner's home, or the next charging station 64. Possibly, the vehicle 10 will only need to be charged to 35% or more to ensure that the electrical vehicle 10 will be able to travel the one hundred miles to the owner's home, wherein the owner can plug the vehicle 10 into a home charger to fully charge the vehicle 10.

The system controller 34A is further adapted to display, for a person 66 in proximity of the vehicle 10, information related to a charge status of the vehicle 10, including, at least one of (1) a level of charge of the electrical system 52 within the vehicle 10, (2) a charging rate of the electrical system 52 within the vehicle 10, when the vehicle 10 is connected to a charging station 64, (3) a time left until the vehicle 10 is charged to the pre-determined threshold, when the vehicle 10 is connected to a charging station 64, and (4) an operating status of a charging station 64 connected to the vehicle 10.

In an exemplary embodiment, when displaying information related to the charge status of the vehicle 10, the system controller 34A is further adapted to display, with an internal/external display system 68 in communication with the system controller 34A and adapted to project information related to the charge status of the vehicle 10 onto a window surface 70 of the vehicle 10, wherein, the projected information related to the charge status of the vehicle 10 is visible from within the vehicle 10 and from outside the vehicle 10.

Figure 3:
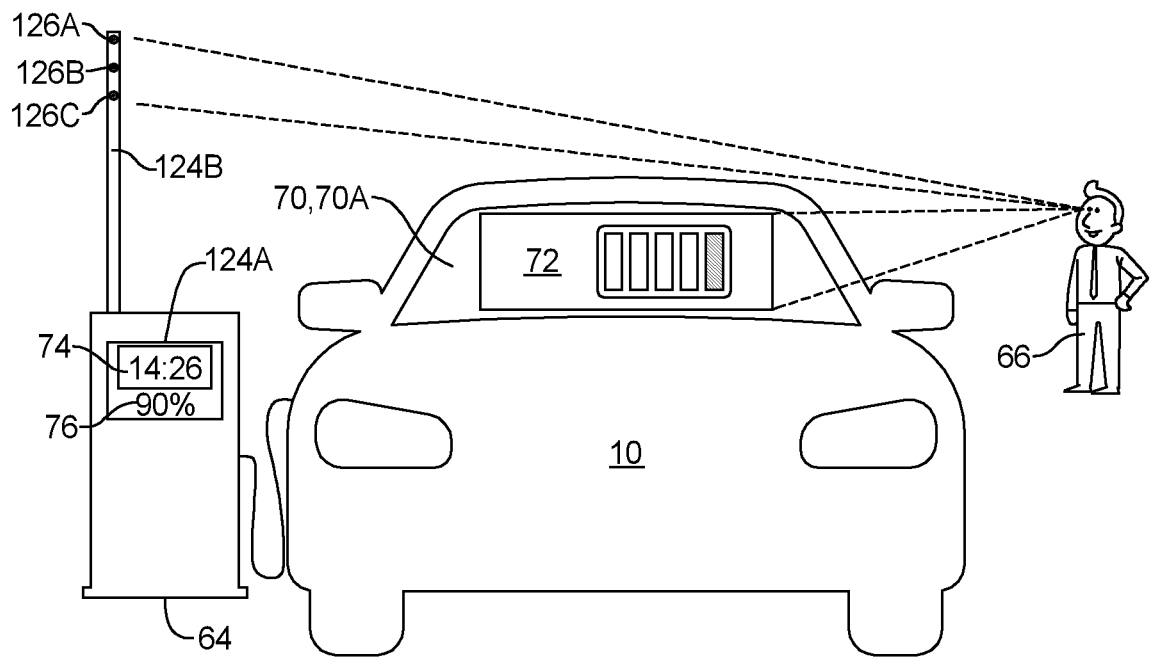
FIG. 3 is a schematic front view of a vehicle that is connected to a charging station.

Referring to FIG. 3, in an exemplary embodiment, the internal/external display system 68 comprises a hybrid augmented reality head up display (HUD) 68. The system controller 34A uses the HUD 68 to display the charging status 72 of the vehicle 10 that is plugged into the charging station 64 on the front windshield 70A of the vehicle 10 (e.g., including but not limited to active, complete, suspended, fault). Likewise, referring to FIG. 4, in another exemplary embodiment, the system controller 34A uses the HUD 68 to display a time remaining 74 (based on the pre-determined threshold) for the charging of the vehicle 10 and a current charge level 76 of the vehicle 10 on a side window 70B. The displayed charging status 72, time remaining 74 and current charge level 76 may be represented with textual information, such as shown with the displayed time remaining 74 in FIG. 4, or may be represented by a graphic that provides an illustrative representation of the information, such as the charging status 72 shown in FIG. 3, wherein the charging status 72 includes a graphical image of a battery and the charging status is illustrated by highlighting 1-5 bars within the battery graphic (as shown, one bar is highlighted).

Displaying information such as the charging status 72, time remaining 74 and current charge level 76 with the internal/external display system 68 such as the HUD 68, allows a person 66 within the vehicle 10 and a person 66 outside of the vehicle 10, as depicted in FIG. 3, to see the displayed information from a distance. Thus, a driver may park the vehicle 10 at the charging station 64, and leave the vehicle 10 and be positioned at a distance from the vehicle 10 while the vehicle 10 is charging and still receive information from the system 11. For example, a person 66 may be sitting at a picnic table near the charging station 64, and is able to periodically glance over to the vehicle 10 to see the status of the charging. Further, in another example, a driver of the vehicle 10 may be notified of the current charge level of the vehicle 10 when the vehicle 10 detects, via communication with external sources 48 (with the communication system 36), such as, for example, but not limited to, GPS, maps, infrastructure databases, and the like, that the vehicle 10 is approaching a charging station 64. The system controller 34A can further provide information of the location of additional charging stations and their availability. Thus, the driver of the vehicle 10, after receiving information of the current level of charge of the vehicle 10 and being notified of the availability of an up-coming charging station 64 and the location of other charging stations, can make a decision to stop at the up-coming charging station 64 or keep going.

The internal/external display system 68 may use any suitable transparent display technology to display information onto the window surfaces 70 of the vehicle 10 to be viewed by persons both internally and externally, or, to be viewed only by persons external to the vehicle 10. Referring to FIG. 5, in an exemplary embodiment, the HUD 68 includes a digital light projector (DLP) 78 adapted to project images 80 onto a window surface 70 of the vehicle 10. The DLP 78 projects an image 80 that may contain various information, such as, by way of example, the charging status 72, time remaining 74 and current charge level 76 shown in FIG. 3 and FIG. 4. The DLP 78 is capable of projecting two-dimensional and three-dimensional images, In an exemplary embodiment, the DLP 78 includes a light source 82 adapted to project an excitation light 84, a condensing lens 86 adapted to focus the excitation light 84 from the light source 82, a color filter 88 (color wheel) adapted to split the focused excitation light 84 into red, green and blue light, a shaping lens 90 adapted to focus the excitation light 84 passing through the color filter 88, a digital micro-mirror device (DMD) 92 adapted to re-direct the excitation light 84, and a projection lens 94 adapted to receive the excitation light 84 from the digital micro-mirror device (DMD) 92 and project the excitation light 84 to the window surface 70.

Referring to FIG. 3, the vehicle controller 34 includes a DLP engine 96. The DLP engine 96 includes a programmable processor including programming to monitor various inputs and determine what information is appropriate to display. The DLP engine 96 can communicate directly with various systems and components, or the DLP engine 96 can alternatively or additionally communicate over a LAN/CAN system. The window surfaces 70, 70A, 70B are equipped with features capable of displaying an image projected thereupon while remaining transparent or substantially transparent such that occupants within the vehicle 10 can clearly see displayed images 80 and still observe outside of the vehicle 10 through the window surfaces 70, 70A, 70B, and persons 66 outside of the vehicle 10 can clearly see displayed images 80 and still observe within of the vehicle 10 through the window surfaces 70, 70A, 70B.

The DLP engine 96 includes display software or programming translating requests to display information from the DLP engine 96 in graphical representations describing the information. The DLP engine 96 includes programming to compensate for the curved and tilted surface of the window surfaces 70, 70A, 70B. The DLP engine 96 controls the light source 82 which includes a laser or projector device producing an excitation light 84 to project the images 80.

Figure 4:
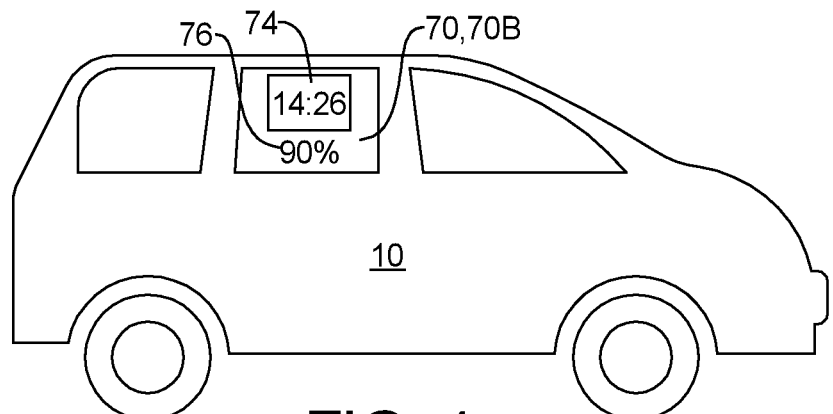
FIG. 4 is schematic side view of the vehicle shown in FIG. 3.
Figure 5:
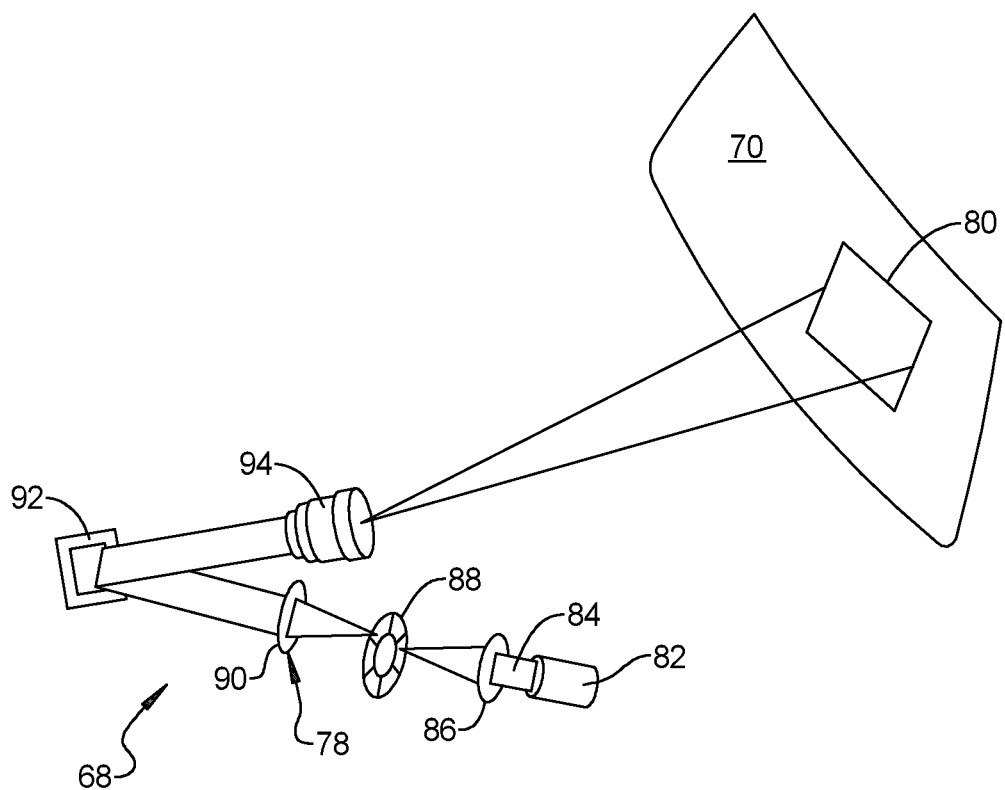
FIG. 5 is a schematic view of a hybrid augmented reality head up display system for the system.
Figure 6:
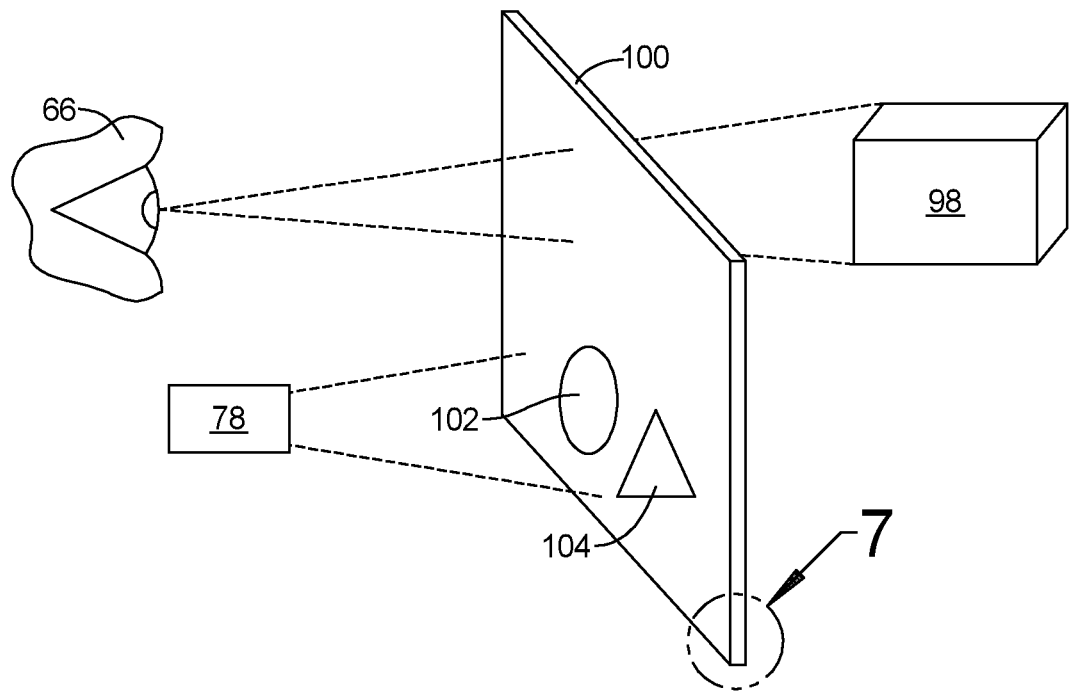
FIG. 6 is schematic illustration of a substrate for the windshield of the vehicle according to an exemplary embodiment.
Figure 7:
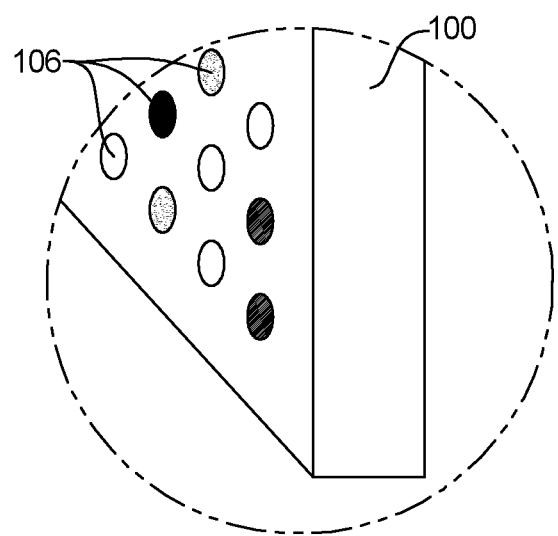
FIG. 7 is a enlarged portion of FIG. 4, as indicated by the circle labelled "7" in FIG. 6.

The window surfaces 70, 70A, 70B function as a medium through which relevant features are observable while serving as a display device upon which images 80, such as the charging status 72, time remaining 74 and current charge level 76 of FIG. 3 and FIG. 4 may be displayed. The window surfaces 70, 70A, 70B are both transparent and capable of displaying images projected by an excitation light 84. Referring to FIG. 6 and FIG. 7, an person 66 is able to see an arbitrary object (e.g. cube 98) through a substrate 100 positioned on the window surfaces 70, 70A, 70B. The substrate 100 may be transparent or substantially transparent. While the person 66 sees the arbitrary object 98 through the substrate 100, the person 66 can also see images (e.g. circle 102 and triangle 104) that are created at the substrate 100. The substrate 100 may be part of the window surfaces 70, 70A, 70B, a glass substrate, a plastic substrate, a polymer substrate, or other transparent (or substantially transparent) medium that would be appreciated by one of ordinary skill in the art. Other substrates may complement the substrate 100 to provide for tinting, substrate protection, light filtering (e.g. filtering external ultraviolet light), and other functions.

FIG. 7 depicts illumination of transparent displays illuminated with excitation light 84 (e.g. ultraviolet light or infrared light) from a light source 82. The substrate 100 receives excitation light 84 from the light source 82. The received excitation light 84 may be absorbed by light emitting material 106 at the substrate 100. When the light emitting material receives the excitation light 84, the light emitting material 106 emits visible light. Accordingly, images (e.g. circle 102 and triangle 104) may be created at the substrate 100 by selectively illuminating the substrate 100 with excitation light 84.

In an exemplary embodiment, the light emitting material 106 includes transparent phosphors that are embedded into the substrate 100. The transparent phosphors are light emitting particles which fluoresce in response to being excited by the excitation light 84. In an exemplary embodiment, the transparent phosphors are red, green, and blue (RGB) phosphors, allowing full color. The use of monochrome and/or two-color phosphors is also within the scope of the present disclosure. When excitation light 84 is absorbed by the transparent phosphors, visible light is emitted by the transparent phosphors. The excitation light 84 is provided by the light source 82. Use of the substrate 100 and light emitting material 106 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 84 may be ultraviolet light, in accordance with embodiments of the present disclosure. If the excitation light 84 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 106 absorbs the ultraviolet light and emits lower energy visible light, the ultraviolet light is down-converted to visible light because the ultraviolet light's energy level goes down when it is converted into visible light.

As shown in FIG. 5, the excitation light 84 is output by the light source 82 of the DLP 78. In an exemplary embodiment, the light source 82 is a micro-mirror array (MMA) projector (e.g. a digital light processing (DLP) projector 78). In the DLP 78, the images 80 are created by microscopically small mirrors laid out in a matrix on a semiconductor chip within the DMD 92. An MMA projector that outputs ultraviolet light may be similar to a MMA projector that outputs visible light, except that the color filter 68 has light filters that are tailored to the ultraviolet light spectrum. In other embodiments, the DLP 78 is a liquid crystal display (LCD) projector. In embodiments, the DLP 78 may be a liquid crystal on silicon (LCOS) projector. In embodiments, the DLP 78 may be an analog projector (e.g. a slide film projector or a movie film projector). One of ordinary skill in the art would appreciate other types of projectors which may be used to project ultraviolet light on the substrate 100.

Figure 8A:
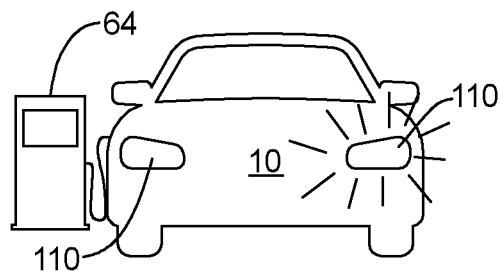
FIG. 8A is a schematic front view of a vehicle that is connected to a charging station, wherein the headlights of the vehicle are blinking.
Figure 8B:
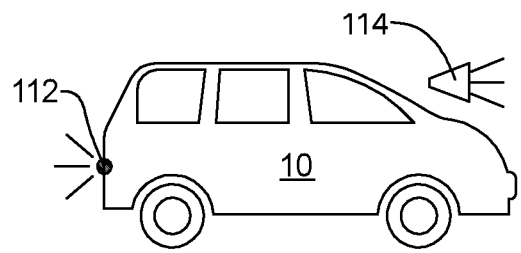
FIG. 8B is a schematic side view of the vehicle shown in FIG. 8B.

In an exemplary embodiment, when displaying information related to the charge status of the vehicle 10, the system controller 34A is further adapted to at least one of (1) actuate, with a lighting system 108 within the vehicle 10 and in communication with the system controller 34A, at least one external light of the vehicle 10, and (2) actuating, with the system controller 34A, an audible device 114. In an exemplary embodiment, the at least one external light comprises one or more of vehicle headlights 110 and vehicle tail-lights 112. Referring to FIG. 8A and FIG. 8B, the system controller 34A communicates information by actuating the headlights and/or tail lights of the vehicle 10. Thus, a person 66 outside of the vehicle 10, as depicted in FIG. 3, can receive the information from a distance. Thus, a driver may park the vehicle 10 at the charging station 64, and leave the vehicle 10 and be positioned at a distance from the vehicle 10 while the vehicle 10 is charging and, still receive information from the system 11. For example, a person 66 may be sitting at a picnic table near the charging station 64, and is able to periodically glance over to the vehicle 10 to see if the headlights and/or tail lights have been actuated.

By way of non-limiting examples, when the vehicle 10 is charging, the headlights 110 and/or tail lights 112 may blink on/off periodically, with the headlights 110 and/or tail lights 112 blinking on/off more often as the vehicle 10 becomes closer to fully charged and staying on when the vehicle 10 is fully charged. Thus, the person 66 gets insight to the charging status based on what the headlights 110 and/or tail lights 112 are doing at any given moment. In another non-limiting example, when the vehicle 10 is charging, the system controller 34A may cause an audible device 114, such as a car horn, to beep periodically, with the audible device 114 beeping more often as the vehicle 10 becomes closer to fully charged and giving three quick beeps when the vehicle 10 is fully charged. Thus, the person 66 gets insight to the charging status based on hearing the beeps of the audible device 114, and how often they occur.

In another exemplary embodiment, when displaying information related to the charge status of the vehicle 10, the system controller 34 is further adapted to at least one of (1) display, with an externally mounted projector 116 in communication with the system controller 34A, information related to the charge status of the vehicle 10 onto a surface 118 adjacent the vehicle 10, and (2) display, with an externally mounted projector 120 in communication with the system controller 34A, light outward from the vehicle 10 onto floating particles within proximity of the vehicle 10, and creating a three-dimensional image 122 including information related to the charge status of the vehicle 10.

Figure 9:
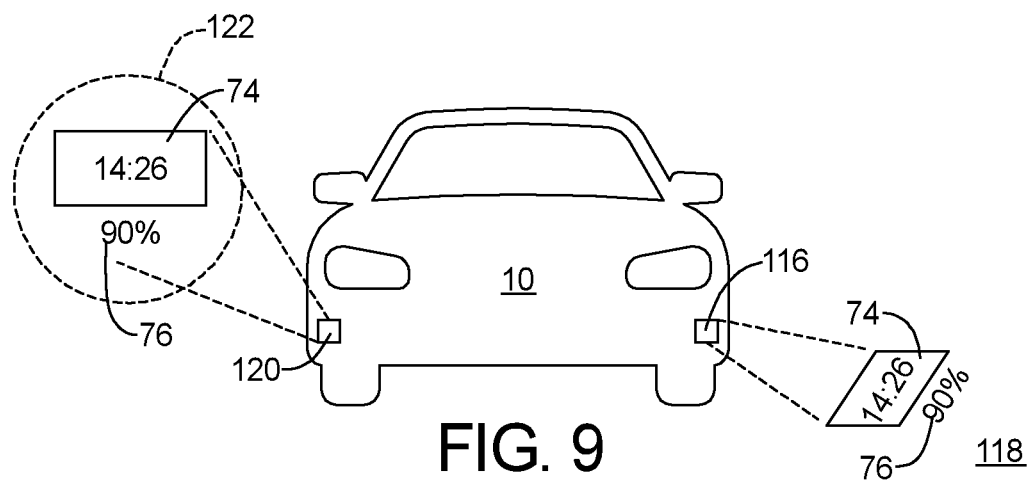
FIG. 9 is a schematic front view of a vehicle that is connected to a charging station, wherein externally mounted projectors display information on a surface adjacent the vehicle.

Referring to FIG. 9, the externally mounted projector 116 projects the time remaining 74 and current charge level 76 shown in FIG. 4 onto the surface 118, which as shown in FIG. 9 is the ground adjacent the vehicle 10. Further, the externally mounted projector 120 projects light, such as laser light, outward that uses particles floating in the air in proximity to the vehicle 10, such as dust and mist, to create a three-dimensional image 122 including the time remaining 74 and current charge level 76 shown in FIG. 4. The external projector 120 may use known methods for creating floating three-dimensional images by bouncing laser light off of dust and mist particles floating in the air or by other volumetric display methods to create a three-dimensional image 122 including the time remaining 74 and current charge level 76, as shown in FIG. 9. Systems that utilize floating particles to create three-dimensional images 122 depend on consistency of the matrix of floating particles to create a "screen" for displaying (reflecting) projected light. A system that creates such a matrix of floating particles may be mounted within the vehicle, under the hood for example, to project such floating particles outward, wherein the three-dimensional image 122 appears floating immediately above the hood of the vehicle 10.

Displaying information such as the time remaining 74 and current charge level 76 as shown in FIG. 9 allows a person 66 within the vehicle 10 and a person 66 outside of the vehicle 10 to see the displayed information from a distance. Thus, a driver may park the vehicle 10 at the charging station 64, and leave the vehicle 10 and be positioned at a distance from the vehicle 10 while the vehicle 10 is charging and still receive information from the system 11. For example, a person 66 may be sitting at a picnic table near the charging station 64, and is able to periodically glance over toward the vehicle 10 to see the time remaining 74 and current charge level 76 displayed by either or both of the externally mounted projectors 116, 120.

In another exemplary embodiment, when displaying information related to the charge status of the vehicle 10, the system controller 34A is further adapted to send information related to the charging status of the vehicle 10 to a connected charging station 64, and to display information related to the charging status of the vehicle 10 with a display 124A, 124B associated with the charging station. The system controller 34A may communicate with the charging station 64 either via the direct connection between the vehicle 10 and the charging station 64 when the vehicle is plugged into the charging station 64, or wirelessly by known methods using the communication system 36.

Referring again to FIG. 3, the charging station 64 is equipped with a display comprising a display screen 124A adapted to display information related to the charging status of the vehicle 10. As shown in FIG. 3, the display screen 124A displays the time remaining 74 and current charge level 76 shown in FIG. 4. Further, the charging station 64 is equipped with a display comprising a light pole 124B having a plurality of lights positioned thereon, the lights adapted to display information related to the charging of the vehicle 10. By way of non-limiting example, the light pole 124B includes three lights 126A, 126B, 126C. A first light 126A is a red light adapted to either blink on/off or stay on when the vehicle 10 is charging and is less than 50% fully charged. A second light 126B is a yellow light adapted to either blink on/off or stay on when the vehicle is charging and is greater than 50% fully charged, but not yet fully charged. A third light 126C is a green light adapted to either blink on/off or stay on when the vehicle is fully charged.

Displaying information such as the time remaining 74 and current charge level 76 on the display screen 124A of the charging station 64, as shown in FIG. 3, or displaying information with the light pole 124B allows a person 66 within the vehicle 10 and a person 66 outside of the vehicle 10 to see the displayed information from a distance. Thus, a driver may park the vehicle 10 at the charging station 64, and leave the vehicle 10 and be positioned at a distance from the vehicle 10 while the vehicle 10 is charging and still receive information from the system 11. For example, a person 66 may be sitting at a picnic table near the charging station 64, and is able to periodically glance over toward the vehicle 10 to see the time remaining 74 and current charge level 76 displayed on the display screen 124A, or see which of the lights 126A, 126B, 126C of the light pole 124B is on or blinking.

In another exemplary embodiment, when displaying information related to the charge status of the vehicle 10, the system controller 34A is further adapted to send information related to the charging status of the vehicle 10 to a personal device 128 associated with a person 66, and display, with the personal device 128, information related to the charging status of the vehicle 10.

Figure 10:
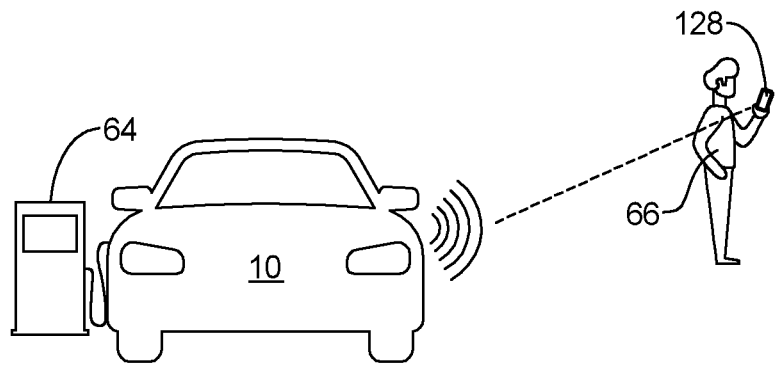
FIG. 10 is a schematic front view of a vehicle that is connected to a charging station, wherein a system controller sends information to a personal device associated with a person.

Referring to FIG. 10, by way of a non-limiting example, the communication system 36 sends information wirelessly to a personal device 128, as shown, a cell phone of the person 66. Thus, a person 66 sitting in the vehicle 10, or located at a distance from the vehicle 10, when the vehicle 10 is charging can receive information such as the current level of charge of the vehicle 10 or the time remaining for the vehicle 10 to be charged to a pre-determined level by simply glancing at a personal device 128, such as a cell phone, smart watch or tablet.

In another exemplary embodiment, when displaying information related to the charge status of the vehicle 10, the system controller 34A is further adapted to display, with a vehicle infotainment system 130 in communication with the system controller 34A and adapted to display information related to the charge status of the vehicle 10 within a human machine interface 132 of the infotainment system 130.

Figure 11:
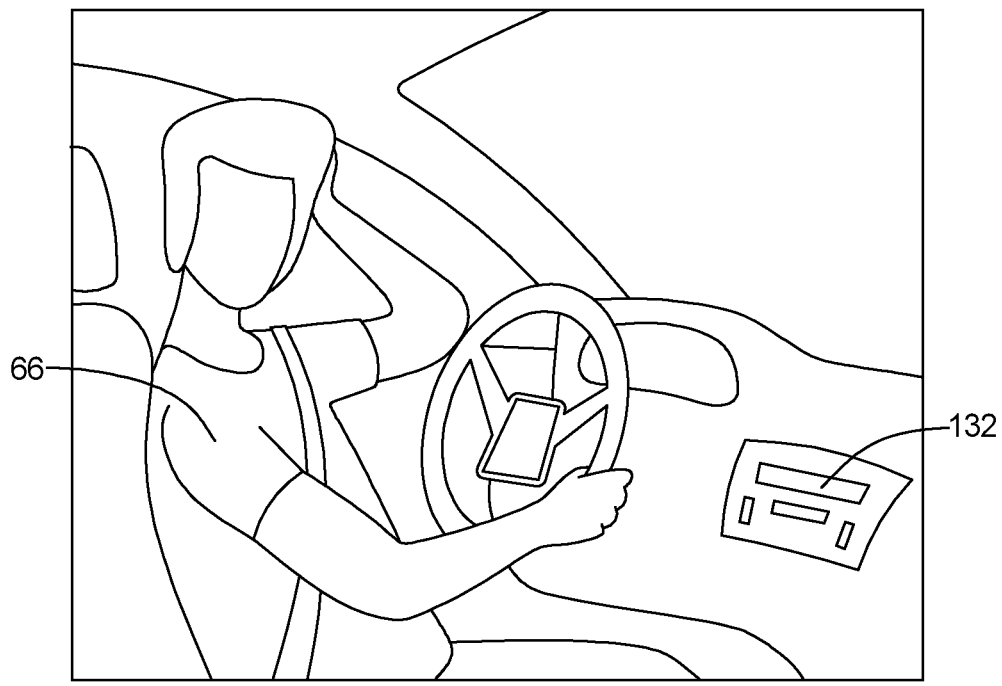
FIG. 11 is a schematic view of the interior of the vehicle shown in FIG. 10.

Referring to FIG. 11, a person 66 sitting in the vehicle 10 can receive information related to the charging status of the vehicle via the human machine interface 132 of the infotainment system 130. Thus, the person 66 sitting in the vehicle 10, either when the vehicle 10 is stationary, or as the vehicle 10 travels along a roadway, can receive information such as the current level of charge of the vehicle 10 or the time remaining for the vehicle 10 to be charged to a pre-determined level by simply glancing at the human machine interface 132. Further, in another example, a driver of the vehicle 10 may be notified of the current charge level of the vehicle 10 via the human machine interface 132 when the vehicle 10 detects, via communication with external sources 48 (with the communication system 36), such as, for example, but not limited to, GPS, maps, infrastructure databases, and the like, that the vehicle 10 is approaching a charging station 64. The system controller 34A can further provide information of the location of additional charging stations and their availability. Thus, the driver of the vehicle 10, after receiving information of the current level of charge of the vehicle 10 and being notified of the availability of an up-coming charging station 64 and the location of other charging stations, can make a decision to stop at the up-coming charging station 64 or keep going.

In another exemplary embodiment, the system controller 34A is further adapted to display, for a person 66 in proximity of the vehicle 10, information related to the charge status of the vehicle 10 when a status request is initiated by at least one of (1) a manual request by a person 66 within the vehicle 10, (2) a manual request by a remote person 66 via a personal device 128, (3) automatically based on a distance to a destination, travel time to the destination and current charge level of the vehicle 10, and (4) automatically based on current charge status of the vehicle 10 and the vehicle's proximity to a charging station 64.

By way of a non-limiting example, the system controller 34A initiates the display of information related to the charge status of the vehicle 10, when, based on the distance to a current destination and the current charge of the vehicle 10, the system controller 34A calculates that the vehicle 10 will not be able to travel all the way to the destination with the current level of charge of the vehicle 10. In such circumstance, the system controller 34A may display such information to the driver of the vehicle 10 via the HUD 68, a personal device 128 or the human machine interface 132 of an infotainment system 130 to alert the driver of the insufficient current level of charge of the vehicle 10 and alerting the driver to up-coming charging stations 64.

Figure 12:
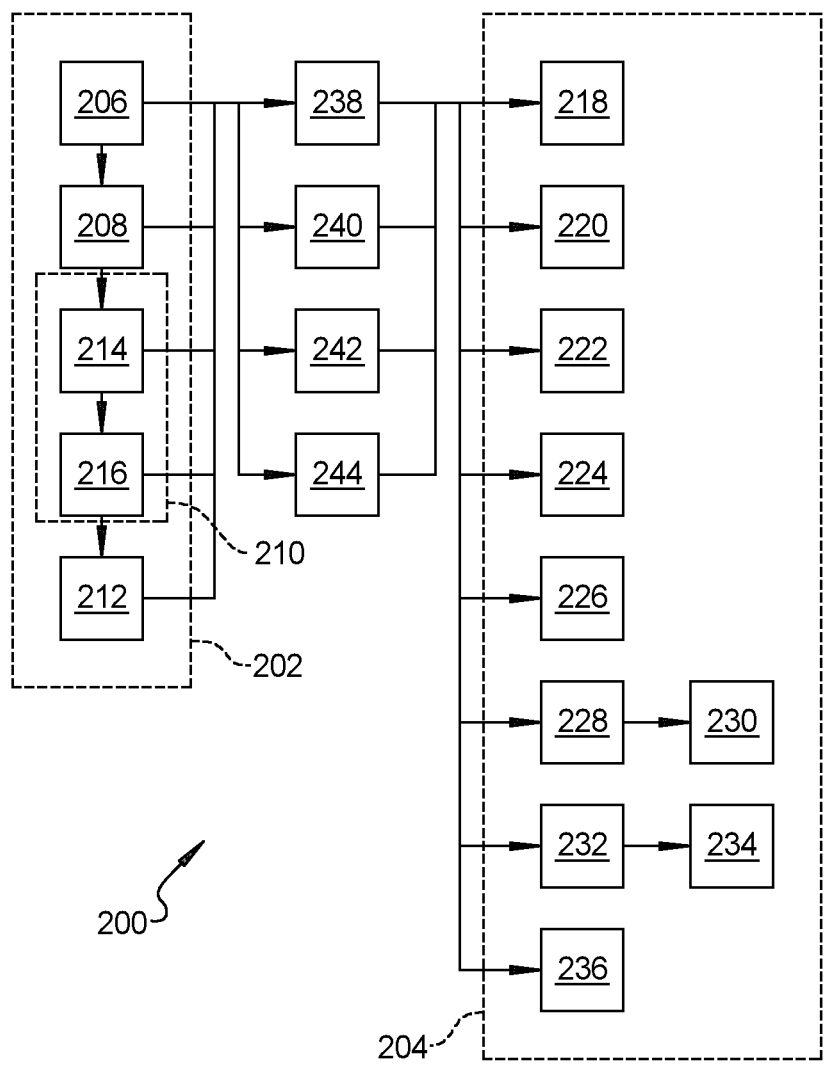
FIG. 12 is a flow chart illustrating a method according to an exemplary embodiment.

Referring to FIG. 12, a method 200 of providing information related to a charge status of an electric vehicle 10 includes, starting at block 202, monitoring, with a system controller 34A in communication with an electrical system 52 within the vehicle 10, information related to a charge status of the vehicle 10, and moving to block 204, displaying, with the system controller 34A, for a person 66 in proximity of the vehicle 10, information related to a charge status of the vehicle 10.

In an exemplary embodiment, the monitoring, with the system controller 34A in communication with the electrical system 52 within the vehicle 10, information related to a charge status of the vehicle 10 at block 202 further includes monitoring, with the system controller 34A, at least one of, moving to block 206, a level of charge of the electrical system 52 within the vehicle 10, moving to block 208, a charging rate of the electrical system 52 within the vehicle 10, when the vehicle 10 is connected to a charging station 64, moving to block 210, a time left until the vehicle 10 is charged to a pre-determined threshold, when the vehicle 10 is connected to a charging station 64, and, moving to block 212, an operating status of a charging station 64 connected to the vehicle 10.

In an exemplary embodiment, when the monitoring, with the system controller 34A, a time left until the vehicle 10 is charged to a pre-determined threshold, when the vehicle 10 is connected to a charging station 64 at block 210 further includes calculating the pre-determined threshold based on one of, moving to block 214, when the vehicle 10 is fully charged, and, moving to block 216, when the vehicle 10 is charged sufficiently to allow the vehicle 10 to travel from the charging station 64 to a planned destination.

In an exemplary embodiment, the displaying, with the system controller 34A, for a person 66 in proximity of the vehicle 10, information related to the charge status of the vehicle 10 at block 204, further includes, moving to block 218, displaying, with a hybrid augmented reality head-up display system 68 in communication with the system controller 34A and adapted to project information related to the charge status of the vehicle 10 onto a window surface 70 of the vehicle 10.

In an exemplary embodiment, the displaying, with the system controller 34A, for a person 66 in proximity of the vehicle 10, information related to the charge status of the vehicle 10 at block 204, further includes at least one of, moving to block 220, actuating, with a lighting system 108 within the vehicle 10 and in communication with the system controller 34A, at least one of vehicle headlights 110 and vehicle tail-lights 112 of the vehicle 10, and moving to block 222, actuating, with the system controller 34A, and audible device 114.

In an exemplary embodiment, the displaying, with the system controller 34A, for a person 66 in proximity of the vehicle 10, information related to the charge status of the vehicle 10 at block 204, further includes, moving to block 224, displaying, with an externally mounted projector 116 in communication with the system controller 34A, information related to the charge status of the vehicle 10 onto a surface 118 adjacent the vehicle 10.

In an exemplary embodiment, the displaying, with the system controller 34A, for a person 66 in proximity of the vehicle 10, information related to the charge status of the vehicle 10 at block 204, further includes, moving to block 226, displaying, with an externally mounted projector 120 in communication with the system controller 34A, light outward from the vehicle 10 onto floating particles within proximity of the vehicle 10, and creating a three-dimensional image 122 including information related to the charge status of the vehicle 10.

In an exemplary embodiment, the displaying, with the system controller 34A, for a person 66 in proximity of the vehicle 10, information related to the charge status of the vehicle 10 at block 204, further includes, moving to block 228, sending, with the system controller 34A, information related to the charging status of the vehicle 10 to a connected charging station 64, and, moving to block 230, displaying, with a display 124A, 123B associated with the charging station 64, information related to the charging status of the vehicle 10.

In an exemplary embodiment, the displaying, with the system controller 34A, for a person 66 in proximity of the vehicle 10, information related to the charge status of the vehicle 10 at block 204, further includes, moving to block 232, sending, with the system controller 34A, information related to the charging status of the vehicle 10 to a personal device 128 associated with a person 66, and, moving to block 234, displaying, with the personal device 128, information related to the charging status of the vehicle 10.

In an exemplary embodiment, the displaying, with the system controller 34A, for a person 66 in proximity of the vehicle 10, information related to the charge status of the vehicle 10 at block 204, further includes, moving to block 236, displaying, with a vehicle infotainment system 130 in communication with the system controller 34A and adapted to display information related to the charge status of the vehicle 10 within a human machine interface 132 of the infotainment system 130.

In an exemplary embodiment, the displaying, with the system controller 34A, for a person 66 in proximity of the vehicle 10, information related to the charge status of the vehicle 10 at block 204, further includes displaying, with the system controller 34A, for a person 66 in proximity of the vehicle 10, information related to the charge status of the vehicle 10 when a status request is initiated by at least one of, moving from block 202 to block 238, a manual request by a person 66 within the vehicle 10, moving from block 202 to block 240, a manual request by a remote person 66 via a personal device 128, moving from block 202 to block 242, automatically based on a distance to a destination, travel time to the destination and current charge level of the vehicle 10, and moving from block 202 to block 244, automatically based on current charge status of the vehicle 10 and the vehicle's proximity to a charging station 64.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing information related to a charge status of an electric vehicle, comprising:
monitoring, with a system controller in communication with an electrical system within the vehicle, information related to a charge status of the vehicle, including at least one of:
a level of charge of the electrical system within the vehicle;
a charging rate of the electrical system within the vehicle, when the vehicle is connected to a charging station; and
a time left until the vehicle is charged to a pre-determined threshold, when the vehicle is connected to a charging station; and
an operating status of a charging station connected to the vehicle; and
displaying, with the system controller, for a person in proximity of the vehicle, information related to a charge status of the vehicle and information related to the operating status of the charging station connected to the vehicle.

2. The method of claim 1, wherein the monitoring, with the system controller, a time left until the vehicle is charged to a pre-determined threshold, when the vehicle is connected to a charging station further includes calculating the pre-determined threshold based on one of:

when the vehicle is fully charged; and when the vehicle is charged sufficiently to allow the vehicle to travel from the charging station to a planned destination.

3. The method of claim 2, wherein the displaying, with the system controller, for a person in proximity of the vehicle, information related to the charge status of the vehicle and information related to the operating status of the charging station connected to the vehicle further includes displaying, with an internal/external display system in communication with the system controller and adapted to project information related to the charge status of the vehicle and information related to the operating status of the charging station connected to the vehicle onto a window surface of the vehicle, wherein the projected information is visible from inside the vehicle and from outside the vehicle.

4. The method of claim 2, wherein the displaying, with the system controller, for a person in proximity of the vehicle, information related to the charge status of the vehicle and information related to the operating status of the charging station connected to the vehicle further includes at least one of:

actuating, with a lighting system within the vehicle and in communication with the system controller, at least one exterior light of the vehicle; and actuating, with the system controller, and audible device.

5. The method of claim 2, wherein the displaying, with the system controller, for a person in proximity of the vehicle, information related to the charge status of the vehicle and information related to the operating status of the charging station connected to the vehicle further includes displaying, with an externally mounted projector in communication with the system controller, information related to the charge status of the vehicle and information related to the operating status of the charging station connected to the vehicle onto a surface adjacent the vehicle.

6. The method of claim 2, wherein the displaying, with the system controller, for a person in proximity of the vehicle, information related to the charge status of the vehicle and information related to the operating status of the charging station connected to the vehicle further includes displaying, with an externally mounted projector in communication with the system controller, light outward from the vehicle onto floating particles within proximity of the vehicle, and creating a three-dimensional image including information related to the charge status of the vehicle and information related to the operating status of the charging station connected to the vehicle.

7. The method of claim 2, wherein the displaying, with the system controller, for a person in proximity of the vehicle, information related to the charge status of the vehicle and information related to the operating status of the charging station connected to the vehicle further includes:

sending, with the system controller, information related to the charging status of the vehicle to a connected charging station; and displaying, with a display associated with the charging station, information related to the charging status of the vehicle.

8. The method of claim 2, wherein the displaying, with the system controller, for a person in proximity of the vehicle, information related to the charge status of the vehicle and information related to the operating status of the charging station connected to the vehicle further includes:

sending, with the system controller, information related to the charging status of the vehicle and information related to the operating status of the charging station connected to the vehicle to a personal device associated with a person; and displaying, with the personal device, information related to the charging status of the vehicle and information related to the operating status of the charging station connected to the vehicle.

9. The method of claim 2, wherein the displaying, with the system controller, for a person in proximity of the vehicle, information related to the charge status of the vehicle and information related to the operating status of the charging station connected to the vehicle further includes displaying, with a vehicle infotainment system in communication with the system controller and adapted to display information related to the charge status of the vehicle and information related to the operating status of the charging station connected to the vehicle within a human machine interface of the infotainment system.

10. The method of claim 2, wherein the displaying, with the system controller, for a person in proximity of the vehicle, information related to the charge status of the vehicle and information related to the operating status of the charging station connected to the vehicle further includes displaying, with the system controller, for a person in proximity of the vehicle, information related to the charge status of the vehicle and information related to the operating status of the charging station connected to the vehicle when a status request is initiated by at least one of:

a manual request by a person within the vehicle;

a manual request by a remote person via a personal device;

automatically based on a distance to a destination, travel time to the destination and current charge level of the vehicle; and automatically based on current charge status of the vehicle and the vehicle's proximity to a charging station.

11. A system for providing information related to a charge status of an electric vehicle, comprising:

a system controller in communication with an electrical system within the vehicle, the system controller adapted to:

monitor information related to a charge status of the vehicle, including at least one of:

a level of charge of the electrical system within the vehicle;

a charging rate of the electrical system within the vehicle, when the vehicle is connected to a charging station;

a time left until the vehicle is charged to a pre-determined threshold, when the vehicle is connected to a charging station, wherein the system controller is adapted to calculate the pre-determined threshold based on one of:

when the vehicle is fully charged; and when the vehicle is charged sufficiently to allow the vehicle to travel from the charging station to a planned destination; and an operating status of a charging station connected to the vehicle; and display, for a person in proximity of the vehicle, information related to a charge status of the vehicle including at least one of:

a level of charge of the electrical system within the vehicle;

a charging rate of the electrical system within the vehicle, when the vehicle is connected to a charging station;

a time left until the vehicle is charged to the predetermined threshold, when the vehicle is connected to a charging station; and an operating status of a charging station connected to the vehicle.

12. The system of claim 11, wherein when displaying information related to the charge status of the vehicle, the system controller is further adapted to display, with an internal/external display system in communication with the system controller and adapted to project information related to the charge status of the vehicle onto a window surface of the vehicle, wherein the projected information is visible from within the vehicle and from outside the vehicle.

13. The system of claim 11, wherein when displaying information related to the charge status of the vehicle, the system controller is further adapted to at least one of:

actuate, with a lighting system within the vehicle and in communication with the system controller, at least one exterior light of the vehicle; and actuate, with the system controller, an audible device.

14. The system of claim 11, wherein when displaying information related to the charge status of the vehicle, the system controller is further adapted to at least one of:

display, with an externally mounted projector in communication with the system controller, information related to the charge status of the vehicle onto a surface adjacent the vehicle; and display, with an externally mounted projector in communication with the system controller, light outward from the vehicle onto floating particles within proximity of the vehicle, and creating a three-dimensional image including information related to the charge status of the vehicle.

15. The system of claim 11, wherein when displaying information related to the charge status of the vehicle, the system controller is further adapted to:

send information related to the charging status of the vehicle to a connected charging station; and display information related to the charging status of the vehicle with a display associated with the charging station.

16. The system of claim 11, wherein when displaying information related to the charge status of the vehicle, the system controller is further adapted to:

send information related to the charging status of the vehicle to a personal device associated with a person; and display, with the personal device, information related to the charging status of the vehicle.

17. The system of claim 11, wherein when displaying information related to the charge status of the vehicle, the system controller is further adapted to display, with a vehicle infotainment system in communication with the system controller and adapted to display information related to the charge status of the vehicle within a human machine interface of the infotainment system.

18. The system of claim 11, wherein the system controller is further adapted to display, for a person in proximity of the vehicle, information related to the charge status of the vehicle when a status request is initiated by at least one of:

a manual request by a person within the vehicle;

a manual request by a remote person via a personal device;

automatically based on a distance to a destination, travel time to the destination and current charge level of the vehicle; and automatically based on current charge status of the vehicle and the vehicle's proximity to a charging station.

19. An electric vehicle having a system for providing information related to a charge status of the electric vehicle, the system comprising:

a system controller in communication with an electrical system within the vehicle, the system controller adapted to:

monitor information related to a charge status of the vehicle, including at least one of:

a level of charge of the electrical system within the vehicle;

a charging rate of the electrical system within the vehicle, when the vehicle is connected to a charging station;

a time left until the vehicle is charged to a predetermined threshold, when the vehicle is connected to a charging station, wherein the system controller is adapted to calculate the pre-determined threshold based on one of:

when the vehicle is fully charged; and when the vehicle is charged sufficiently to allow the vehicle to travel from the charging station to a planned destination; and an operating status of a charging station connected to the vehicle; and display, for a person in proximity of the vehicle, information related to a charge status of the vehicle including at least one of:

a level of charge of the electrical system within the vehicle;

a charging rate of the electrical system within the vehicle, when the vehicle is connected to a charging station;

a time left until the vehicle is charged to the predetermined threshold, when the vehicle is connected to a charging station; and an operating status of a charging station connected to the vehicle;

wherein, the system controller is adapted to display information by one of:

displaying information with an internal/external display system adapted to project information onto a window surface of the vehicle, wherein the projected information is visible from within the vehicle and from outside the vehicle;

actuating at least one of vehicle headlights and vehicle tail-lights;

displaying information with an externally mounted projector onto a surface adjacent the vehicle;

displaying light outward from the vehicle, onto floating particles within proximity of the vehicle, with an externally mounted projector, and creating a three-dimensional image including information related to the charge status of the vehicle;

sending information related to the charging status of the vehicle to a connected charging station, and displaying information related to the charging status of the vehicle with a display associated with the charging station;

sending information related to the charging status of the vehicle to a personal device associated with a person, and displaying, with the personal device, information related to the charging status of the vehicle; and displaying, with a vehicle infotainment system in communication with the system controller and adapted to display information related to the charge status of the vehicle within a human machine interface of the infotainment system;

the system controller further adapted to display, for a person in proximity of the vehicle, information related to the charge status of the vehicle when a status request is initiated by at least one of:

a manual request by a person within the vehicle;

a manual request by a remote person via a personal device;

automatically based on a distance to a destination, travel time to the destination and current charge level of the vehicle; and automatically based on current charge status of the vehicle and the vehicle's proximity to a charging station.

* * * * *